Figure 1:
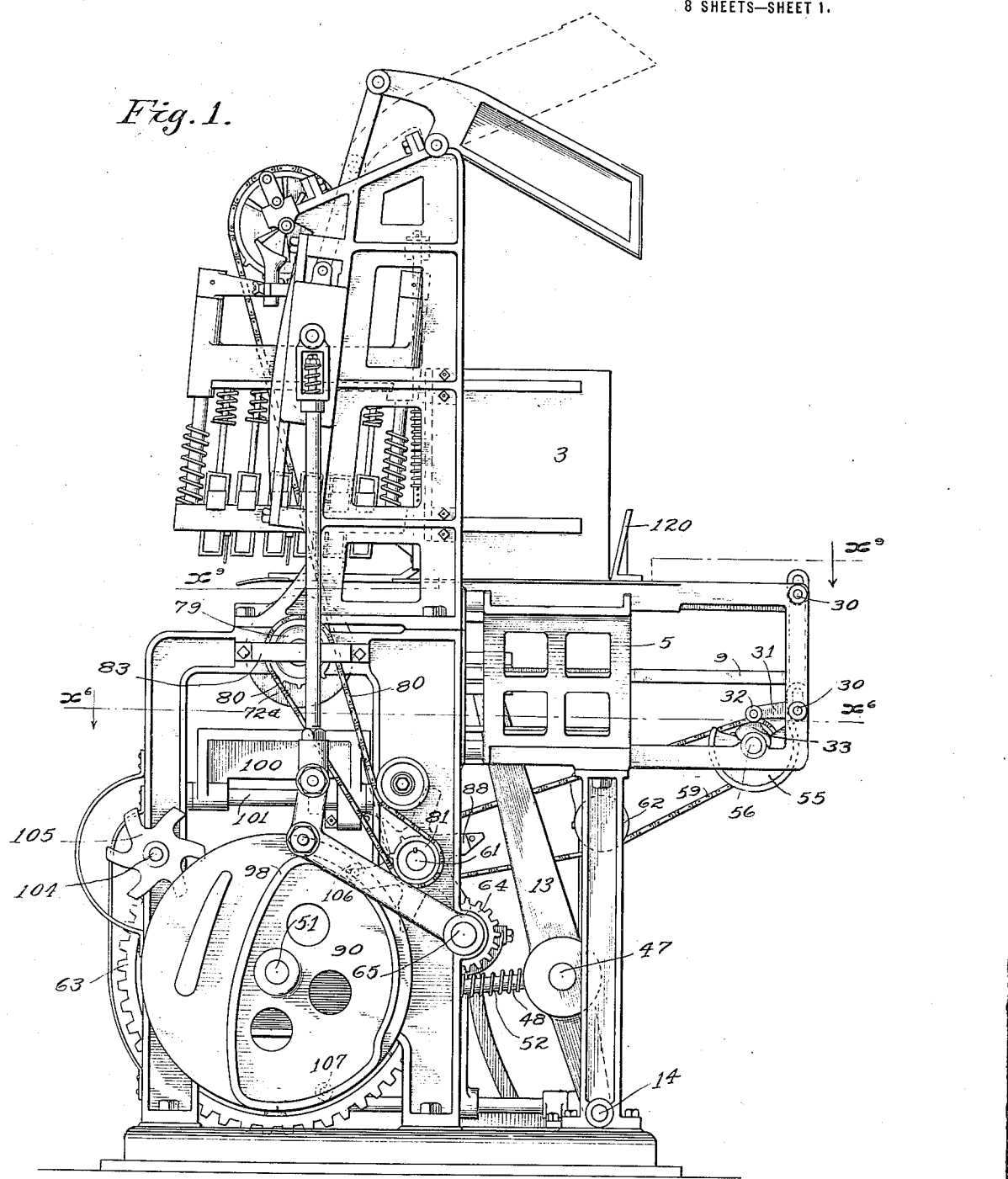

E. C. NORTHRUP.
BOX MAKING MACHINE.
APPLICATION FILED FEB. 15, 1911. RENEWED MAR. 31, 1913.

1,144,497.

Patented June 29, 1915.
8 SHEETS—SHEET 1.

Witnesses:
J. D. Thornburgh
Lute A. Stes

Inventor:
Elmer C. Northrup.
by Townsend & Haenle
atty

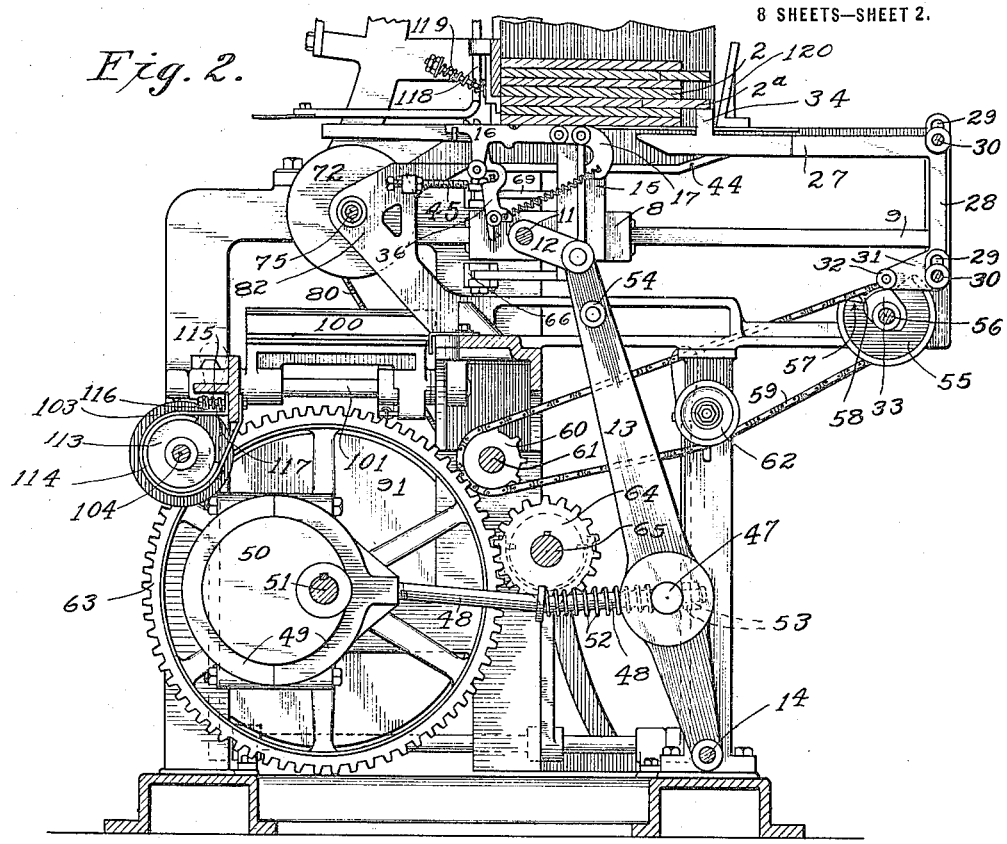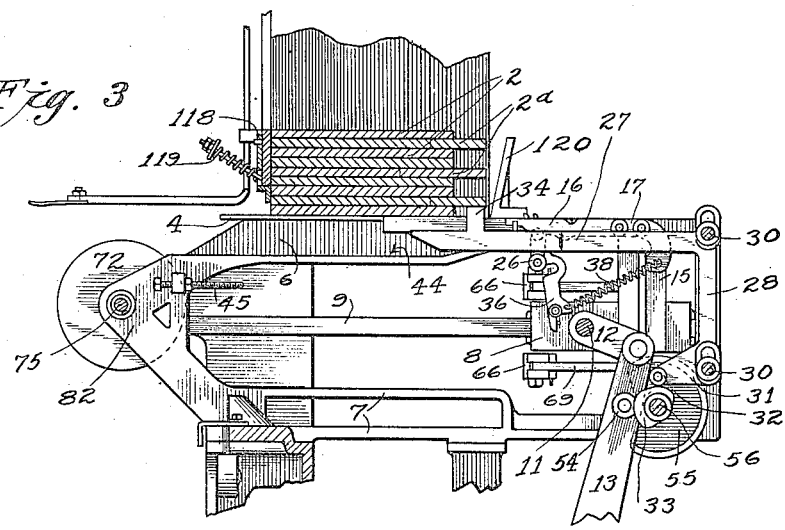

E. C. NORTHRUP.
BOX MAKING MACHINE.
APPLICATION FILED FEB. 15, 1911. RENEWED MAR. 31, 1913.

1,144,497.

Patented June 29, 1915.
8 SHEETS—SHEET 3.

Witnesses:
J. D. Thornburgh.

Inventor:
Elmer C. Northrup.

E. C. NORTHRUP.
BOX MAKING MACHINE.
APPLICATION FILED FEB. 15, 1911. RENEWED MAR. 31, 1913.
1,144,497.
Patented June 29, 1915.
8 SHEETS—SHEET 4.
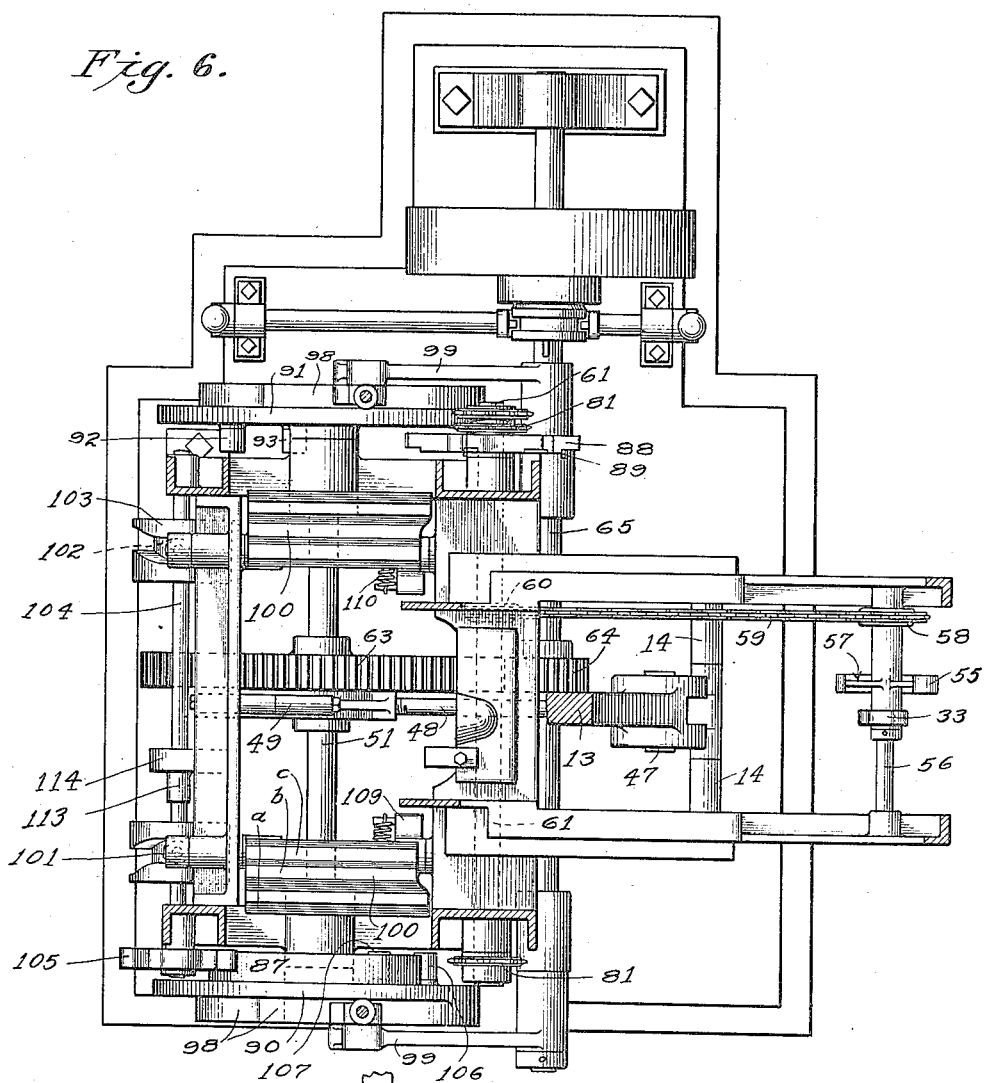
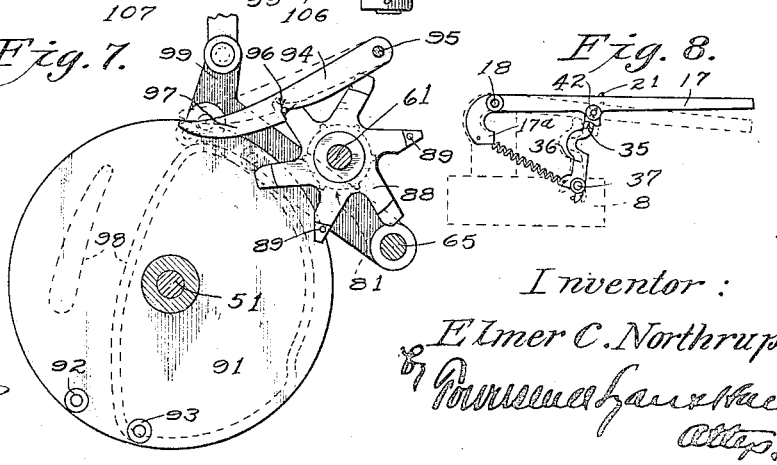
Witnesses:
J. D. Thornburgh
Inventor:
Elmer C. Northrup.

E. C. NORTHRUP.
BOX MAKING MACHINE.
APPLICATION FILED FEB. 15, 1911. RENEWED MAR. 31, 1913.
1,144,497.
Patented June 29, 1915.
8 SHEETS—SHEET 5.
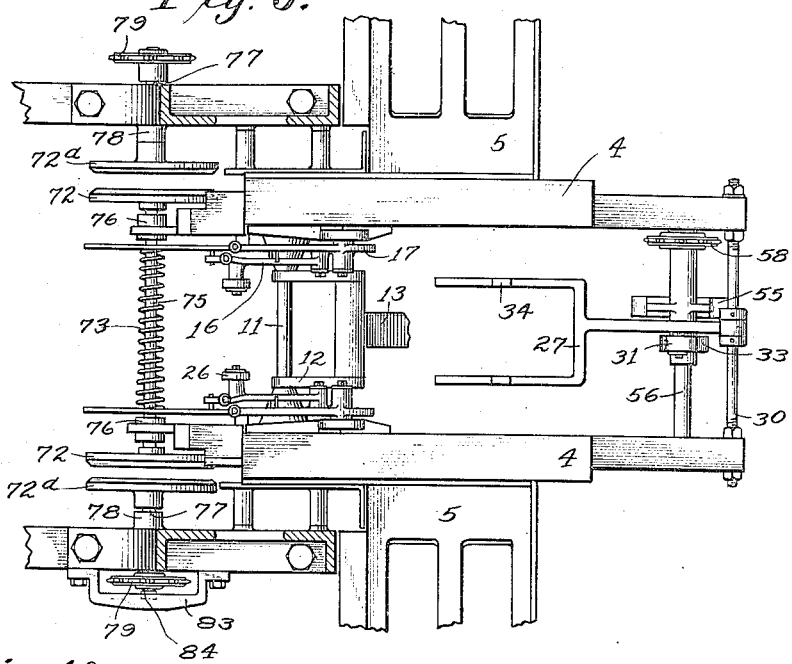
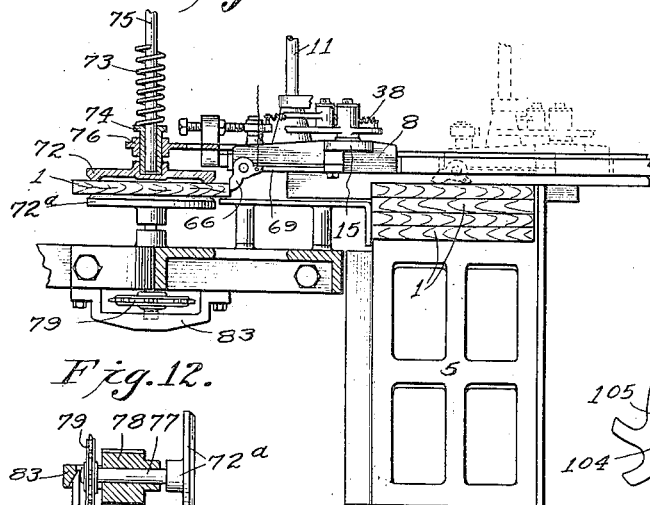
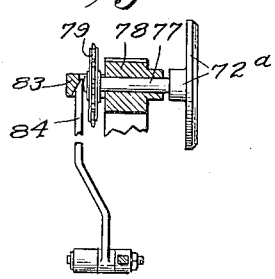
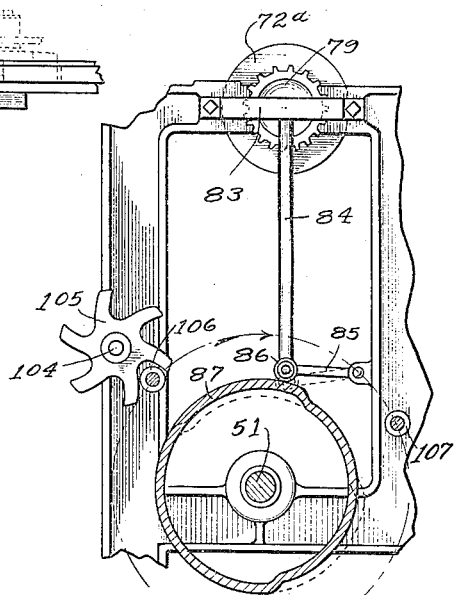
Witnesses:
I. D. Thornburgh
Lute D. Alter
Inventor:
Elmer C. Northrup E. C. NORTHRUP.
BOX MAKING MACHINE.
APPLICATION FILED FEB. 15, 1911. RENEWED MAR. 31, 1913.
1,144,497.  Patented June 29, 1915.
8 SHEETS—SHEET 6.
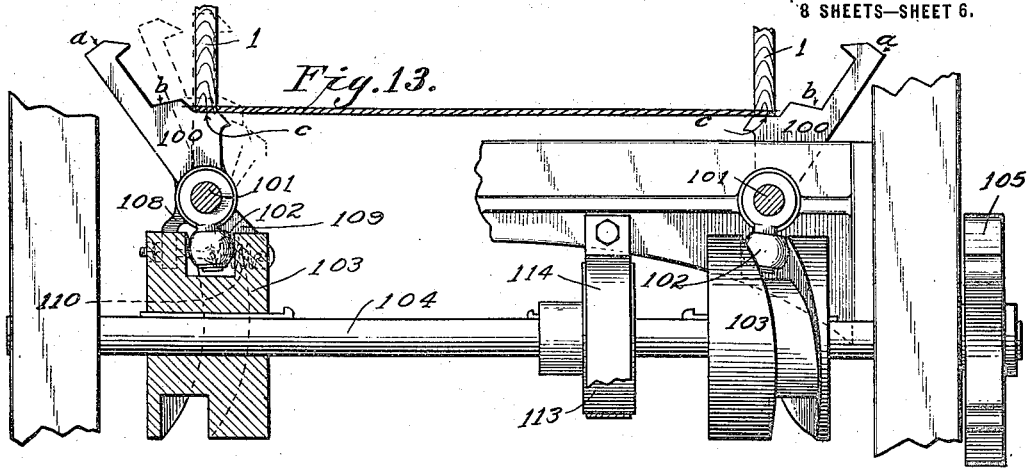
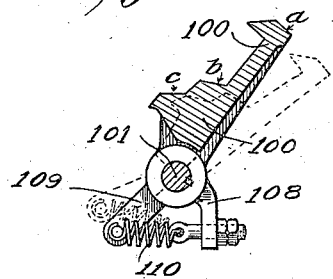
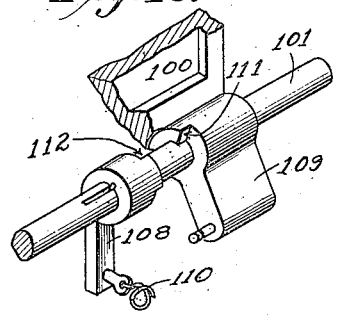
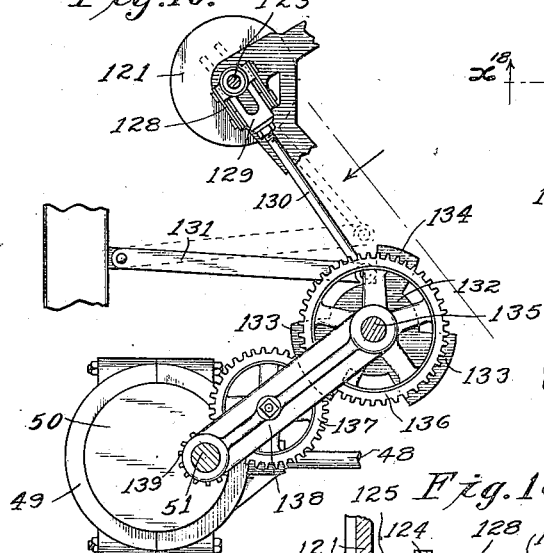
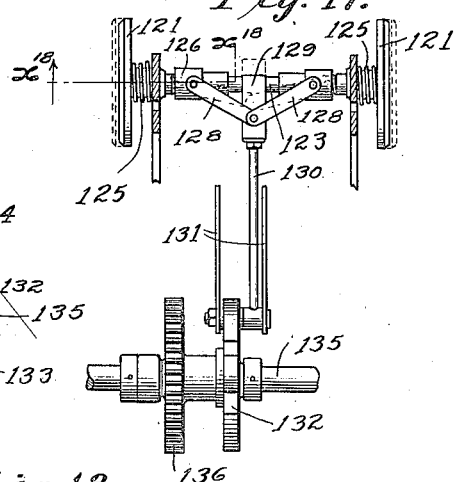
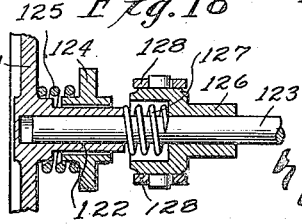
Witnesses:
J. D. Thornburgh
Lute B. Alter
Inventor:
Elmer C. Northrup

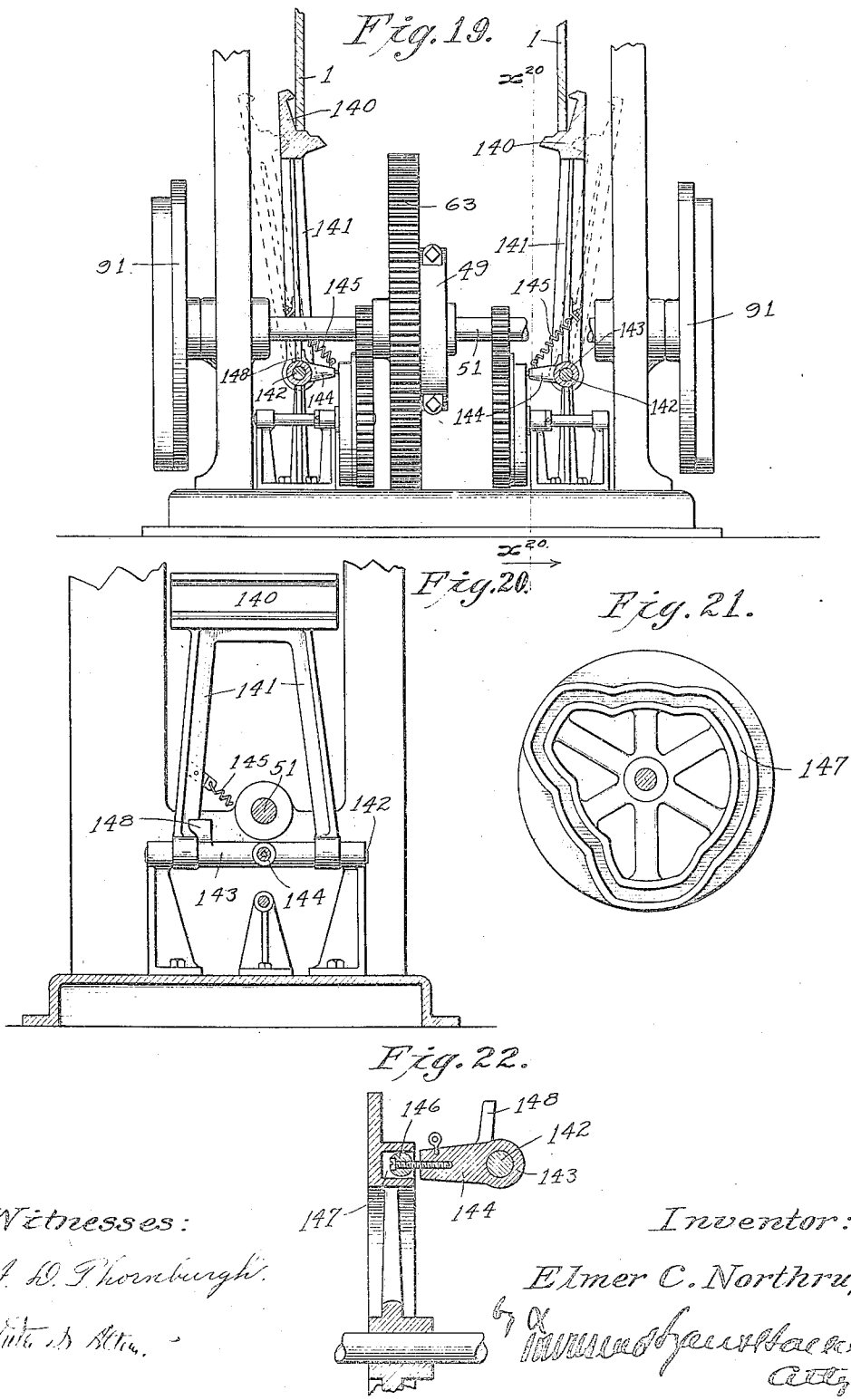

UNITED STATES PATENT OFFICE.

ELMER C. NORTHRUP, OF SAN FRANCISCO, CALIFORNIA, ASSIGNOR TO AUTOMATIC MACHINE COMPANY, OF SAN FRANCISCO, CALIFORNIA, A CORPORATION OF CALIFORNIA.

BOX-MAKING MACHINE.

1,144,497. Specification of Letters Patent. Patented June 29, 1915.

Application filed February 15, 1911, Serial No. 608,817. Renewed March 31, 1913. Serial No. 758,050.

*To all whom it may concern:*

Be it known that I, ELMER C. NORTHRUP, a citizen of the United States, residing at San Francisco, in the county of San Francisco and State of California, have invented a new and useful Box-Making Machine, of which the following is a specification.

This invention relates to box making machines, and one object of the invention is to improve the table mechanism; to provide a cheaper construction and make it possible to swing the tables out of the way without backing up the machine, which operation is very convenient in the event of an extra wide box head or two sides getting into the machine.

Another important advantage is that the table is a swinging table and is yieldingly supported so that no damage can occur if it should swing back before the box was turned. Sometimes while the box is being turned, its movement is interrupted and before it has completed its turning movement, the table is moved against it which would result in damage if the table could not yield.

Another object is to provide a novel and simple clamping mechanism, the plates of which frictionally grip the box heads not only while the shook is in position, but also during the movement of the heads into clamping position. Thus the clamping plates press against the heads as the latter are moved into clamping position and prevent the heads from jumping or jarring out of place when pushed in.

Another important object is to operate the box turning mechanism, shook carrier, carrier regulating mechanism and nail cut-off from one cam which in turn is operated by a star-wheel.

Another important object is to provide pivotally mounted dogs for moving the box heads forward and to yieldingly support such dogs, whereby, if a head should stick, as it often does on account of pitch between it and the next piece or by reason of a knot falling out of a knot-hole and catching, the dogs will yield and turn and move forward without the head which was stuck and thus prevent damage to the machine.

Another object is to positively lock the star-wheel which operates the box turning mechanism against rotation during the turning of a box, for the reason that pitch on the shook sometimes sticks to the disks and would turn the latter if it were not locked and would thereby disarrange its position.

Many other objects and advantages will be brought out in the following description.

Figure 4:
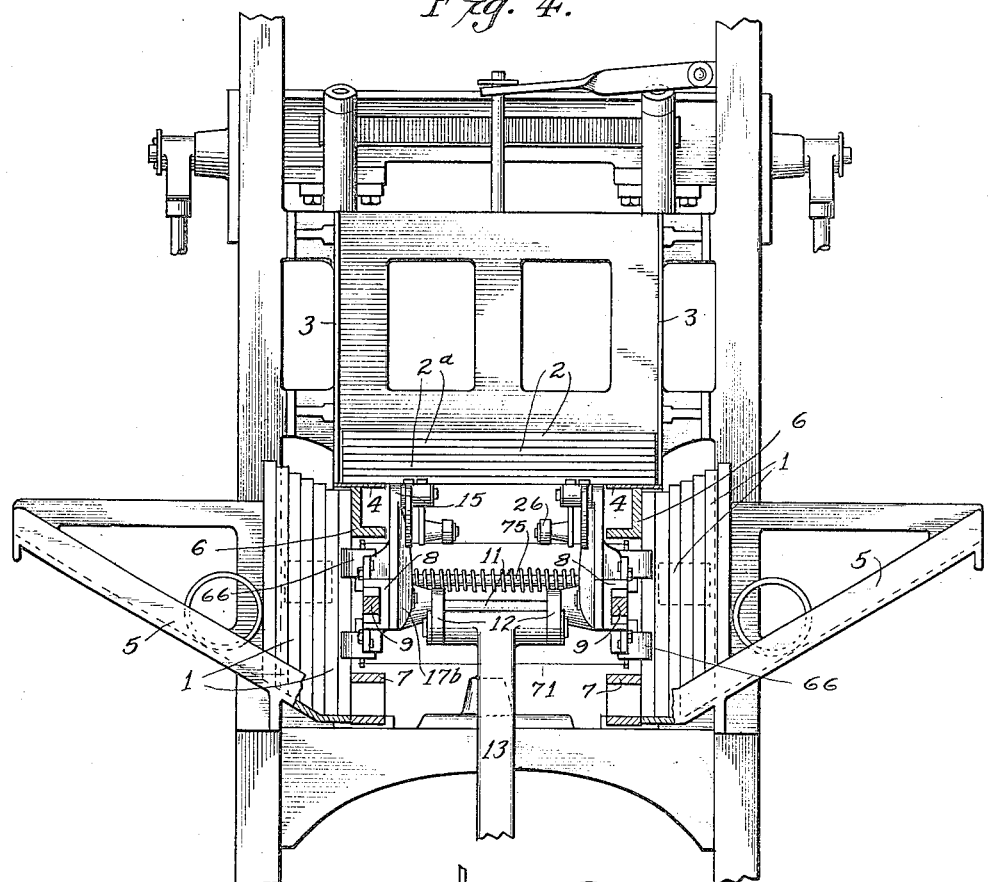
Figure 5:
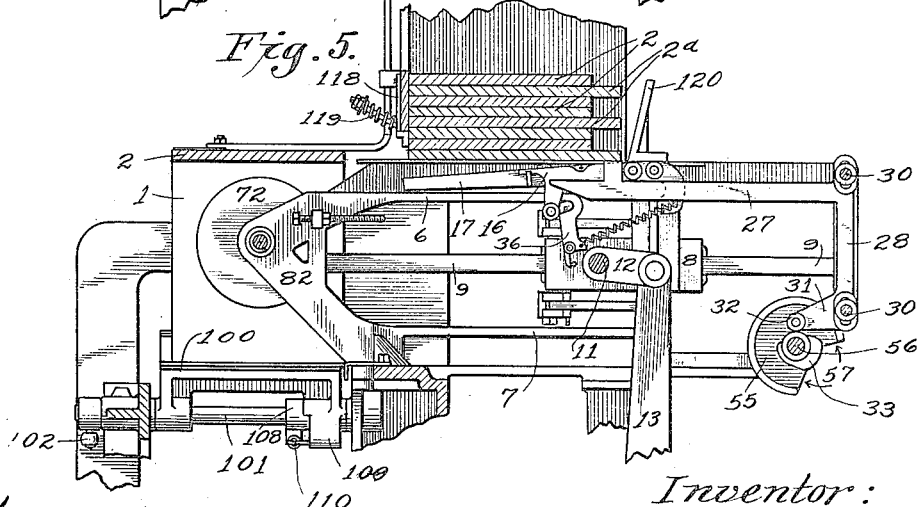
Figure 23:
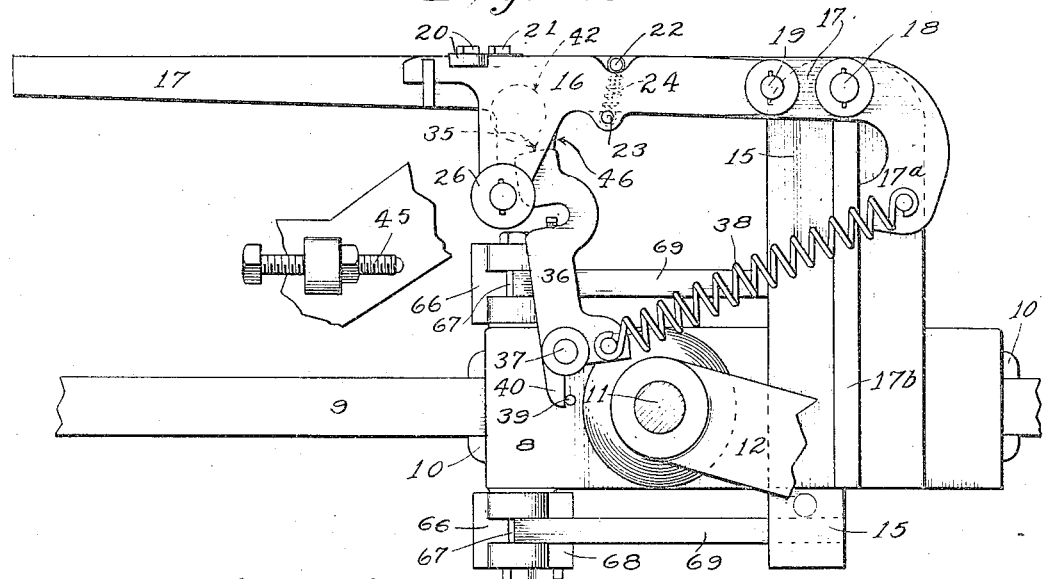
Figure 24:
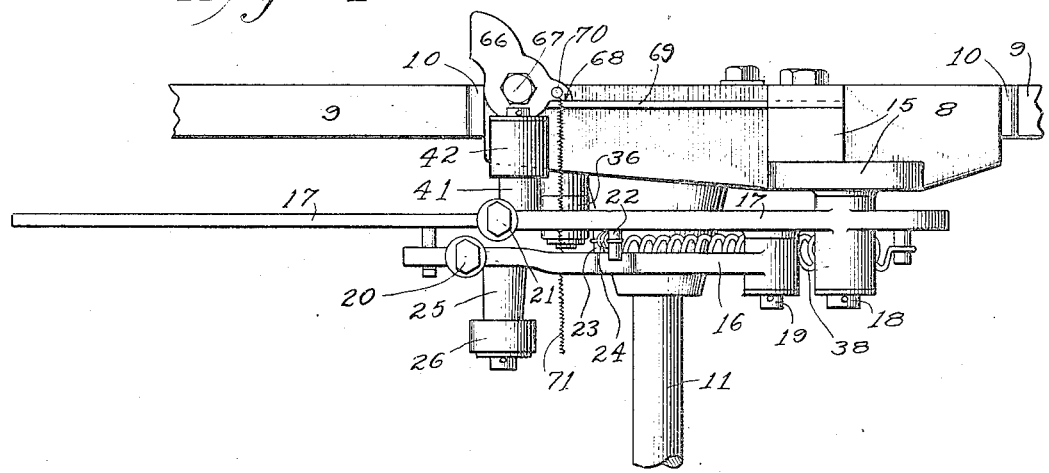

Referring to the drawings: Figure 1 is a side elevation of the machine. Fig. 2 is a central longitudinal section of the lower portion of the machine. Fig. 3 is a view of the upper portion of what is shown in Fig. 2, showing the shook carrier in retracted position. Fig. 4 is a rear elevation of the central portion of the machine. Fig. 5 is a view similar to Fig. 3, showing the shook carrier at an intermediate point. Fig. 6 is a horizontal section on line $x^6$—$x^6$ Fig. 1. Fig. 7 is a detail view of the cam, star-wheel and locking mechanism for operating the shook holder of the mechanism. Fig. 8 is a side elevation in detail of one of the pivoted arms, which carries forward the sides, and its releasable supporting arm. Fig. 9 is a section on line $x^9$—$x^9$ Fig. 1. Fig. 10 is a view of the lower portion of what is shown in Fig. 9, showing the head carrier in dotted position. Fig. 11 is a sectional view looking at the reverse side of the large cam and adjacent part of the frame with operating star-wheel. Fig. 12 is a side elevation of the shiftable clamping disk with wedge bar for controlling same. Fig. 13 is a front elevation, partly in section, of the tables and cams for directly operating them. Fig. 14 is a detail view, partly in section, through a table, dotted lines illustrating it in another position. Fig. 15 is a perspective view of a portion of a table and its pivotal support. Fig. 16 is a side elevation of a modified form of clamping mechanism. Fig. 17 is a view of what is shown in Fig. 16, looking in the direction of the arrow in Fig. 16. Fig. 18 is an enlarged section on line $x^{18}$—$x^{18}$ Fig. 17. Fig. 19 is a front elevation, partly in section, of another form of table and its operating mechanism. Fig. 20 is a section on line $x^{20}$—$x^{20}$ Fig. 19. Fig. 21 is a side elevation of the cam employed in the mechanism shown in Fig. 19. Fig. 22 is an enlarged detail of the roller and cam shown in Fig. 19. Fig. 23 is an enlarged face view of the cross-head and shook carrier. Fig. 24 is a plan view of Fig. 23.

In making a box three sizes of shook are provided, that for the ends or heads being designated 1 and that for the sides 2 and that for the bottoms 2ⁿ, the bottoms 2ª being wider than the sides 2. The sides 2 and 2ª are assembled in the machine in a pile at one point, while the heads 1 are assembled in two different piles at each side of the carrier mechanism. The pile of sides is arranged between two side plates 3 and rest upon horizontal plates 4 which form ways upon which the lowest piece of shook is moved forward into nailing position at the proper time by the carrier mechanism. The heads 1 are arranged vertically in inclined chutes 5, see Fig. 4, so that they feed by gravity, delivering heads at each side of the carrier mechanism in proper position for being carried forward, the lowermost head resting against horizontal bars 6 and 7 of the frame, the bars 6 guiding the upper edge of the heads and the bars 7 guiding the lower edges of the heads.

The mechanism which carries the shook for the sides forward into nailing position comprises a cross head, see Figs. 2, 3, 4, 5 and 9, which comprises two blocks 8, which rspectively slide on horizontal bars 9, the blocks 8 being provided with gibs 10 for taking up the wear. The blocks 8 are connected by an arbor 11 which is connected by two links 12 with the upper end of an arm 13 which, as shown in Figs. 1 and 2, is pivoted at 14 at the bottom of the frame. The arm 13 is intermittently oscillated in a manner to be described. Projecting up from each block 8 is a bracket 15 and pivoted to each bracket 15 are two arms 16 and 17, the longer arm 17 being pivoted at 18 to the bracket 15 and the shorter arm 16 being pivoted at 19 directly to the arm 17. The short arm 16 has a lug 20 projecting from its upper edge which acts against the edge of a side to push the latter in when the arm 16 is operated for that function, while the arm 17 has a lug 21 which acts to push a button in when the arm 17 is operated for that function, as will be described. As clearly shown in Fig. 23, a pin 22 projects from the long arm 17 over the upper edge of the short arm 16 and a pin 23 projects from the short arm 16 and is connected by an extension spring 24 with the pin 22 and serves to hold the short arm 16 so that its upper edge is parallel with the long arm 17, the pin 22 acting as a stop to limit the upward position of the short arm 16.

Projecting from the arm 16 is a boss 25 carrying a roller 26 which is adapted to ride under an arm 27 which projects from a vertically sliding frame 28, (see Fig. 2), the frame 28 having slots 29 which are guided by studs 30 and having an arm 31 with a roller 32 which is operated by cam 33 in a manner to be described. The arm 27 has a boss 34 which is adapted to rest under a projecting bottom, as illustrated in Fig. 3 to support the latter as the bottoms are usually in two or more pieces and if a narrow piece happens to be at the rear it would not be supported sufficiently by the contiguous side pieces and would fall down were it not for the supporting bosses 34.

Each of the arms 17 has a shoulder 35 on its underside which is adapted to be engaged by a latch 36 which is pivoted at 37 to the block 8. The spring 38 connects the latch 36 with the end of the lever 17 and normally holds the latch 36 with its end under the shoulder 35 supporting the arm 17 and also holds a toe 17ª on the arm 17 against a rib 17ᵇ which holds the arm 17 in a horizontal position.

39 is a stop pin against which a toe 40 of the latch 36 strikes.

Projecting from the lever 17, as shown in Fig. 24, is a boss 41 with a roller 42 which is adapted to ride on a track 44, (Fig. 2), whereby as the blocks 8 move rearwardly, the arms 17 will be lifted as the rollers 42 ride up the inclined portion of tracks 44. This lifting movement of the arms 17 does not occur, however, until after the bosses 20 and 21 have moved back far enough to come behind the rear edge of a side or bottom which enables the boss to engage behind the rear edge of the side or bottom and push the latter forward as the arms 17 and 16 advance and thus move the sides or bottoms into nailing position. During their forward movement the arms 17 are supported by the latches 36, but when near the termination of their forward movement, the latches 36 strike adjusting screws 45 which disengage the latches 36 from shoulders 35, permitting the arms 17 to lower somewhat so that as they move back they are not in engagement with the side or bottom and thus do not drag it back. During this movement the arm 17 is supported solely by the stiff spring 38 and the upper ends of the latches 36 rest against faces 46 of the shoulders 35 and are ready to be snapped by spring 38 into position again under shoulders 35 as soon as arms 17 are again lifted. The shook carrier just described has a variable length of stroke and in moving back during each stroke it moves back far enough for the bosses 20 and 21 to engage the rear edge of a side or bottom. During each third stroke, however, it is caused to move back slightly farther for a reason to be described. This movement is accomplished by a carrier regulating mechanism which comprises a laterally extending pin 47 which is swiveled in arm 13 and slidable diametrically through the pin 47 is a rod 48 which is connected with an eccentric strap 49 on an eccentric 50 on the shaft 51. A compression spring 52 on the rod 48 serves to act against the arm 13 and push back the latter as the rod 48 is moved in that direction. Nuts 53 on the end of the rod 48 serve to pull the arm 13 forwardly. The arm 13 is thus moved rearwardly by a yielding element and in order to vary its stroke, it is simply necessary to arrest its rearward movement which is accomplished by a roller 54 on the arm 13 striking against a cam 55 on a shaft 56, the cam 55 having a cut-away portion 57 which receives the roller 54 at every third stroke and permits the arm 13 to move the required farther distance rearward. During the other two strokes the roller 54 hits against the concentric portion of the cam 55 and arrests further rearward movement of the arm 13, while the spring 52 is compressed by the rearwardly moving rod 48. The shaft 56 is driven by a sprocket 58 connected by a chain 59 on sprocket 60 on shaft 61. 62 is an idler for taking up slack in chain 59. The shaft 51 is driven by a gear 63 which in turn is driven by a pinion 64 on the main driving shaft 65.

The heads 1 are moved forward, two at a time, by dogs 66 pivoted at 67 to each block 8, each dog having a shoulder 68 which rests against a stiff flat spring 69 projecting from the bracket 15 and each dog has a pin 70 which is connected by an extension spring 71 with the similar pin on the opposite dog. As clearly shown in Fig. 10, during the backward stroke of the carriage the dogs 66 swing inward and slide over the inner face of the innermost heads 1 until they arrive at the rear edge of the head when the dogs snap outwardly, being pulled by the spring 71 and thus engage behind the edges of the two heads 1, so that as the carriage moves forward the heads 1 will be advanced into the position shown in Fig. 10. It is only at every third rearward movement of the carriage that the dogs are moved back far enough to engage the rear edges of the heads; during the other two rear movements of the carriage the dogs are only moved to approximately the position shown by the dotted lines in Fig. 10 and thus simply slide idly over the inner faces of the heads without moving the heads forward. It sometimes happens that pitch or a projecting knot will cause a head to stick and thus were not some means provided for permitting the dog to yield, breakage would occur. To this end, I have provided the flat springs 69. Each spring 69 is stiff enough to support its dog 66 in extended position and prevent it from swinging rearwardly when opposed by the normal resistance of a head against being pushed forward; but, if the head sticks or catches, the spring 69 will yield and let the dog 66 swing out and thus ride freely forward over the inner face of the head 1, thereby avoiding breakage or damage to the machine.

As the heads 1 are moved forward, they are pushed between two pairs of turning disks 72 and 72ª, see Figs. 9 and 10. The two innermost disks 72 are yieldingly pressed outward toward their adjacent heads by a single coil spring 73 which presses against a sleeve 74 on a shaft 75, the sleeve 74 being journaled in bearings 76 on a frame 82 and the disk 72 being free to turn on sleeve 74. One outer disk 72ª is mounted on a short shaft 77 which is journaled in a bearing 78 and is also slidable therein and carries a sprocket 79; while the other disk 72ª is mounted on a shaft 77 journaled in a bearing 78, but has no end play; said shaft also carries a sprocket 79. The sprockets 79 are connected by chains 80 with sprockets 81 on the shaft 61, driven in a manner to be explained. As shown in Figs. 11 and 12, between the end of one of the shafts 77 and a frame bracket 83 is a wedge rod 84 which when moved upwardly will act against the end of the shaft 77 to move the same inwardly, thus moving its disk 72ª toward the disk 72 and when the wedge rod 84 is moved down it releases the shaft 77 and permits the latter to move outwardly. The wedge rod 84 is pivotally connected at its lower end to a link 85, as shown in Fig. 11, and a roller 86 on the end of link 85 operates on a cam 87 mounted on the main shaft 51. The face of the cam 87 is so proportioned that the wedge rod 84 will be lifted, so that the box will be clamped between the disk 72ª and 72 during nailing operations; while during the other third revolution of the cam 87 the wedge rod 84 is released to relax the disk 72 and permit the box to be easily pushed out of engagement with the disks 72 and 72ª. It might be thought that as the disks 72 merely engage the box frictionally that the box could be easily pushed out from engagement therewith, but I have found in practice that such is not the case, there being too great an amount of friction, and I, therefore, have devised means for relaxing the pressure of the disks to permit the box to be easily ejected when finished.

The shaft 61, previously referred to, is driven by a star-wheel 88, see Fig. 7, which is provided with six teeth, every alternate third tooth having a transverse pin 89. Mounted on the shaft 51 are two large cams 90 and 91, the cam 91, as shown in Fig. 6, being adjacent the star-wheel 88, the cam 90 being on the opposite side of the machine. The cam 91 has two rollers 92 and 93 which are adapted to operate the star-wheel, each roller actuating the star-wheel one-sixth, so that for each complete revolution of the cam 91, the star-wheel having been acted upon by both rollers 92 and 93 will have been turned one-third around. In order to lock the star-wheel 88 from rotation when not being operated by rollers 92 and 93, I provide a retaining pawl 94 pivoted at 95 and having a notch 96 to engage pins 89 and having a curved finger 97.

In operation, the notch 96 during two-thirds of the revolution of the cam 91 engages the pin 89 and holds the star-wheel from rotation and as the first roller 92 comes under the curved finger 97, it lifts the retaining pawl 94 so that its notch 96 disengages the pin 89 and thus releases the star-wheel 88 and as soon as the roller 92 strikes one of the arms of the star-wheel it turns the star-wheel one-sixth, whereupon the roller 92 disengages the arm of the star-wheel, but in the meantime before the roller 92 had reached the arm of the star-wheel and commenced to turn it, the roller 93 had moved under the retaining pawl 94 and lifted the latter, so that it would not prevent the rotation of the star-wheel by the first roller 92. As soon as the first roller 92 has released its arm of the star-wheel, the second roller 93 has been moved into engagement with the succeeding arm of the star-wheel and turns the latter one-sixth, whereupon the retaining pawl 94 drops and notch 96 engages the next pin 89. In this manner the shaft 82 is turned one-third of a revolution for each revolution of the big cam 91. The other side of the cams 90 and 91 have cam faces 98 for operating arms 99 which operate nail cut-off mechanism. As the nail cut-off mechanism forms no part of the present invention, description of the same is omitted, it being claimed in another application of mine filed Feb. 15, 1911, Serial No. 608,816. In order to support the heads of the box in nailing position, tables 100 are provided, each being pivoted on a shaft 101, see Figs. 1, 2, 13, 14 and 15. Depending from the front end of each shaft is a roller 102 which engages a cam 103 on a shaft 104. Each table has three faces $a$, $b$, and $c$. On the shaft 104 is a star-wheel 105 which is operated by rollers 106 and 107 on the inner side of cam 90, see Figs. 1 and 11, the star-wheel 105 being turned one-sixth by the roller 107 during one-sixth revolution of the main shaft 51, and remains stationary during one-third movement of the main shaft 51, whereupon roller 106 engages star-wheel 105 and turns the latter another one-sixth of a revolution and the star-wheel then remains stationary, while the main shaft 51 turns two-thirds of a revolution. As the star-wheel 105 and shaft 104 are thus operated, the cams 103 act upon the rollers 102 to swing the tables 100 into the proper position for supporting the box or out of position under the box for releasing the same; thus, when the tables 100 are in a position such that the heads 1 rest upon the faces $b$ of the tables, the box is supported during the nailing of the first side, then the star-wheel 105 is operated one-sixth of a revolution and the tables 100 swing out to free the heads 1 and permit the partially completed box to be turned by the turning mechanism before described. Then the tables 100 are moved in by cams 103 being operated by a one-sixth movement of the star-wheel, and the heads rest on faces $a$, while the bottom is being nailed, then the star-wheel is again turned one-sixth which releases the tables from the box and the box is turned and the star-wheel turns another sixth of a revolution and operates the cams 103 and the tables swing back, so that the box rests on the face $c$, while the last side is being nailed, then the box is pushed off by the incoming heads and simultaneously with the passage of the box the star-wheel turns again one-sixth and again one-sixth and through the cams 103 moves the tables 105 inwardly bringing the faces $b$ again into position in time to support the incoming heads. At the inner end of each shaft 101 is an arm 108 rigidly secured thereto while the table 100 has an arm 109 which is connected with the arm 108 by coiled spring 110, the hub of the table 100 having a shoulder 111, as clearly shown in Fig. 15, which acts as a stop for a shoulder 112 on the hub of the arm 108 to limit the forward position of the tables, but permitting the tables to yieldingly swing back stretching the springs 110. This constitutes a safety device whereby the springs 110, although being strong enough to normally cause the tables 100 to oscillate with the shafts 101, will yield if the tables in swinging forward should happen to strike the box before the latter had been turned and thus prevent damage. In order to prevent the shaft 104 from rotating except when actuated by the star-wheel 105, I provide a friction bracket consisting of a drum 113, see Figs. 2 and 13, which is secured to the shaft 104 and a bracket band 114 passes over it, one end being held back of a compression spring 115 which is retained by a nut 116 on a bolt 117, so that by adjusting the nut 116, the tension of spring 115 and pressure of bracket band 114 against the drum 113 may be regulated. Sometimes in pushing a bottom or side forward, two of them will stick together, caused sometimes by pitch between them or a knot, and to prevent damage I have provided a safety gate 118 which is normally held in a vertical position by compression springs 119, with its lower end acting as a stop to prevent the piece next to the last piece from moving out, but if the piece next to the bottom piece should stick and move out with the bottom piece, the springs 119 will yield and permit the gate 118 to swing outwardly, allowing the passage of the two pieces without doing any damage to the machine. A bracket 120 is arranged back of the pile of sides and bottoms to guide them when being fed into the machine and hold them from disarrangement when piled.

Another form of clamping mechanism is shown in Figs. 16, 17 and 18, wherein the clamping disks 121 are formed with hubs 122, see Fig. 18, which are slidable on the ends of a shaft 123, the hubs 122 being supported in a frame bearing 124 with a short coil compression spring 125 between the frame 124 and disk 121. On the shaft 123 is a sliding collar 126 within which is a compression spring 127 which bears against the end of the hub 122. Toggle levers 128 are pivoted to the respective sleeves 126 and connected to a yoke 129 which slides transversely on the shaft 123 and which is connected by a rod 130 with a pivoted arm 131, the end of which rides on a cam 132 having two wide cam faces 133 and a narrower cam face 134, the cam 132 being mounted on a shaft 135 on which is a gear 136 driven by an intermediate gear 137 on an arm 138, and the gear 137 is driven by a pinion 139. As the cam 132 operates the arm 131, the rod 130 is reciprocated, which operates the toggle levers 128 and causes the latter to press out the disks 121, and the disks 121 being arrested by the box, the springs 127 become compressed by the straightening of the toggle levers 128, thereby producing the requisite amount of pressure against the box. When the toggle relaxes, the disks 121 are released from their maximum pressure against the box, although the springs 125 still hold the disks 121 with a certain amount of pressure against the box sufficient to prevent it from being dislodged accidentally and enabling it to be easily pushed out when finished. When new heads are being pushed in between the disks, the disks are held in position by the springs 125 only, as the toggle at that time is not straightened and there is no pressure from the springs 127. The cam 134 acts to hold the toggle straightened and the disks firmly press against the box during that part of the cycle of operations in which nailing only takes place, while the cams 133 in turn hold the toggle straightened and the disks in clamping position during those two parts in the cycle of operations wherein the box is nailed and turned. At intermediate points between these three positions, the toggle is relaxed, while the only pressure exerted by the clamping disks is that produced by the springs 125.

Figs. 19 to 22, inclusive, show another form of table in which 140 designates the tables, each table being mounted on a frame 141, the frame 141 being mounted to rock on a shaft 142. 143 is a sleeve on shaft 142 with a projecting arm 144 which is connected by a spring 145 with the frame 141. On the end of the arm 144 is a spherical roller 146 engaging in a cam 147. 148 is a lug on the sleeve 145 which engages in front of the frame 141 and serves to move the frame 141 and table 140 outward when the shaft 142 is moved in that direction by the cam 147 and the lug 148 also acts as a stop to properly position the table 140 when in either one of its three inner positions, as determined by the cam 147. At the same time the lug 148 does not prevent the table 140 from moving outwardly and yielding in the event that the box should not have turned when the table swings back, thereby forming a safety device which prevents breakage of the machine.

What I claim is:

1. In a box making machine, a star wheel, mechanism operated thereby for turning the box, a shook carrier, carrier regulating mechanism, nail cut-off mechanism, and a single cam for operating the foregoing elements.

2. In a box making machine, means for turning the box comprising two pairs of clamping disks, means for yieldingly pressing the members of each pair of disks toward each other to frictionally hold the head of the box while the heads are being moved into position between the clamping disks and during the turning thereof, and means for automatically reducing the yielding pressure of said disks against the heads after the last turning movement to permit the box to be easily disengaged from the clamping disks.

3. In a box making machine, means for feeding the heads forward comprising a pivoted dog arranged to engage behind the edge of a head to push the same forward and capable of yielding in both directions, and stiffly yielding means for strongly supporting the dog against yielding in one direction but permitting it to yield in that direction under an excess of resistance from the head to allow the dog to swing back free from the resisting head and be moved forward without carrying the head with it.

4. In a box making machine, table means supporting the box, box turning mechanism, means for moving the table from the box to permit the box to be turned, a star-wheel for operating the box turning mechanism, and means for positively locking said star-wheel after the turning of a box.

5. In a box making machine, means for supporting the box comprising a pair of tables, each table having a plurality of supporting faces, and a cam coöperating with each table for swinging the table, said table being yieldingly supported with respect to the associated cam, whereby the table can yield if the box has not been turned completely into position before the table swings back.

6. In a box making machine, two outer clamping disks, two inner clamping disks, means slidably supporting the two inner disks, and a compression spring between the inner disks tending to force the inner disks toward the outer disks.

7. In a box making machine, two outer disks, two inner disks, a shaft on which the two inner disks are slidably and revolubly mounted, and a compression spring between the two inner disks for forcing them outwardly.

8. In a box making machine, two outer disks, two inner disks, a shaft on which the two inner disks are slidably and revolubly mounted, a compression spring between the two inner disks for forcing them outwardly, and means for permitting one of the outer disks to move longitudinally.

9. In a box making machine, two outer disks, two inner disks, a shaft on which the two inner disks are slidably and revolubly mounted, a compression spring between the two inner disks for forcing them outwardly, a shaft supporting one of the outer disks, said shaft being movable longitudinally, a wedge bar bearing against the end of said shaft, and means for operating said wedge bar to hold the shaft from endwise movement or permit endwise movement according to the position of the wedge bar.

10. In a box making machine, a pair of brackets, sleeves in said brackets, a shaft with its ends in said sleeves, inner clamping disks on the respective sleeves, a compression spring between said sleeves forcing them apart, and outer clamping disks opposite the respective inner disks.

11. In a box making machine, means for feeding the box heads forward comprising a carrier, dogs pivoted on the carrier and arranged to engage behind the edges of the box heads, each of said dogs having a shoulder, and a stiff flat spring secured to the carrier and bearing against said shoulder and normally holding the dog in working position, said spring being of such strength as to yield and permit the dog to rotate out of engagement with the box head if the pressure of the box head against the dog is more than the normal pressure.

12. In a box making machine, means for feeding the heads forward comprising a carrier, dogs pivoted on the carrier and arranged to engage behind the edges of the heads, each of said dogs having a shoulder, a stiff flat spring secured to the carrier and bearing against said shoulder, and a coil spring connecting said dogs and holding their shoulders against said flat spring.

13. In a box making machine, box turning mechanism, a star-wheel for operating the box turning mechanism, and means for positively locking said star-wheel after the turning of a box, comprising a notched pawl, a pin on alternate arms of the star-wheel arranged to engage the notch in said pawl, and a pair of rollers mounted to swing in a path to coöperate with the arms of the star-wheel, one of said rollers acting to lift said pawl out of engagement with the pin of an arm of the star-wheel when the following roller reaches the succeeding arm of the star-wheel to permit the star-wheel to be turned by the latter roller.

14. In a box making machine, means for supporting the box comprising a pair of pivoted tables, each of said tables having a plurality of faces, a shaft, a pair of cams on the shaft, a pair of shafts extending transversely of the first shaft, said tables being mounted on the two transverse shafts, a hub fixed on each of the transverse shafts, a roller carried by each of said hubs and engaging one of said cams, and yielding means between each hub and its associated table for operating the table in one direction.

15. In a box making machine, means for supporting the box comprising a pair of pivoted tables, each of said tables having a plurality of faces, a shaft, a pair of cams on the shaft, a pair of shafts extending transversely of the first shaft, said tables being mounted on the two transverse shafts, a hub fixed on each of the transverse shafts, a roller carried by each of said hubs and engaging one of said cams, yielding means between each hub and its associated table for operating the table in one direction, and a clutch between each table and the aforesaid shaft, whereby each table is moved positively in the other direction with said shaft.

16. In a box making machine, a shaft, two cams thereon, means for rotating said shaft in one direction, a pair of transverse shafts, tables mounted on the transverse shafts, hubs on the transverse shafts, a roller carried by each of said hubs engaging one of said cams, an arm projecting from each of said hubs, an arm projecting from each of said tables, and an extension spring between each table arm and one of said hub arms, whereby the table is yieldingly operated in one direction.

17. In a box making machine, means for supporting the box comprising a pair of pivoted tables, each of said tables having a plurality of faces, a shaft, a pair of cams on the shaft, a pair of shafts extending transversely of the first shaft, said tables being mounted on the two transverse shafts, a hub fixed on each of the transverse shafts and carrying a roller which coöperates with one of said cams, yielding means between each hub and one of said tables for operating the table in one direction, a star-wheel, on the first shaft, a driving shaft, and a pair of rollers operated by the driving shaft for operating said star-wheel.

18. In a box making machine, means for supporting a box comprising a pair of pivoted tables, each table being formed with three supporting faces, the said faces being at different distances from the axis of the table and having beveled walls which act to lift the box heads slightly if necessary as the tables swing into supporting position.

19. In a box making machine, a carrier, a pair of arms pivoted to said carrier and arranged to support the shook as the latter is carried forward, lugs on said arms for engaging behind the edge of the shook to move the same forward as the arms advance, pivoted supporting arms, a shoulder on each of the first arms engaged by one of said supporting arms, and a stop screw against which the supporting arms move and are arrested, whereby while the first arms continue forward toward the end of their stroke and their shoulders move out of engagement with the supporting arms and drop, they are out of contact with the shook during their return stroke.

20. In a box making machine, a carrier, a pair of arms pivoted to said carrier and arranged to support the shook as the latter is carried forward, lugs on said arms for engaging behind the edge of the shook to move the same forward as the arms advance, means for lowering said arms when near the end of their forward movement, shorter arms pivoted to the first arms, lugs on the shorter arms for engaging behind other pieces of shook, and means for depressing the shorter arms during certain strokes.

21. In a box making machine, a carrier, a pair of arms pivoted to said carrier and arranged to support the shook as the latter is carried forward, lugs on said arms for engaging behind the edge of the shook to move the same forward as the arms advance, means for lowering said arms when near the end of their forward movement, shorter arms pivoted to the first arms, lugs on the shorter arms for engaging behind other pieces of shook, a roller carried by each of the short arms, and a vertically movable frame with inclined ends against which said rollers are arranged to ride when said frame is in its lower position thereby depressing the said short arms.

22. In a box making machine, a carrier, a pair of arms pivoted to said carrier and arranged to support the shook as the latter is carried forward, lugs on said arms for engaging behind the edge of the shook to move the same forward as the arms advance, means for lowering said arms when near the end of their forward movement, shorter arms for engaging behind other pieces of shook, a roller carried by each of the short arms, a vertically movable frame with inclined ends against which said rollers are arranged to ride when said frame is in its lower position thereby depressing the said short arms, an arm on said frame, a roller on said frame arm, a cam for operating said last-mentioned roller to lift said frame at certain points in its cycle, and a star-wheel with gearing for driving said cam.

23. In a box making machine, a carrier, a pivoted arm, links connecting the upper end of said arm with the carrier, and means for operating said arm comprising an eccentric, a rod connected thereto, a pin on the arm through which said eccentric rod loosely passes, a compression spring between an abutment on said rod and said pin, and variable means for arresting the spring-impelled movement of said arm to vary the degree of movement thereof.

24. In a box making machine, a carrier, a pair of arms pivoted thereto and having off-set extensions at their rear ends, said arms having shoulders, pivoted triggers on the carrier normally supporting said shoulders and having coöperative relation with the opposite extensions, means for disengaging said triggers from said shoulders when said triggers are near the forward limit of their stroke, and a spring connecting each trigger with the associated off-set extension of each of the arms for moving the trigger underneath its shoulder when the arms are raised.

25. In a box making machine, a carrier, a pair of arms pivoted thereto and having off-set extensions at their rear ends, the arms having shoulders, pivoted triggers on the carrier normally supporting said shoulders, means for disengaging said triggers from said shoulders when said triggers are near the forward limit of their stroke, a spring connecting each trigger with the associated off-set extension of each of the arms for moving the trigger underneath its shoulder when the arms are raised, and means for raising said arms comprising rollers carried on the arms and a stationary inclined way upon which said rollers ride during the return stroke of the carrier.

26. In a box making machine, a carrier, a pair of arms pivoted to said carrier and arranged to support the shook as the latter is carried forward, lugs on said arms for engaging behind the edge of the shook to move the same forward as the arms advance, means for lowering said arms when near the end of their forward movement, shorter arms pivoted to the first arms, lugs on the shorter arms for engaging behind other pieces of shook, a roller carried by each of the short arms, and a vertically movable frame with inclined ends against which said rollers are arranged to ride when said frame is in its lower position thereby depressing the said short arms, said vertically movable frame having upwardly projecting extensions for supporting the shook.

27. In a box making machine, a carrier, a pair of arms pivoted to the carrier and having off-set ends, a second pair of arms pivoted to the first arms, the first and second arms having lugs on their upper edges, a pair of triggers arranged to engage and support the first mentioned arms during most of their forward movement, means for disengaging said triggers from said first mentioned arms when near the conclusion of their forward movement, and springs extending from said triggers to the off-set ends of said arms, said springs being of a tension to permit the said first mentioned arms to drop slightly when released by said triggers and to support the same after they have dropped slightly.

In testimony whereof, I have hereunto set my hand at Los Angeles, California, this 2d day of February, 1911.

ELMER C. NORTHRUP.

In the presence of—
G. F. HACKLEY,
FRANK L. A. GRAHAM.